United States Patent
Wang

(10) Patent No.: US 11,160,027 B2
(45) Date of Patent: Oct. 26, 2021

(54) METHOD AND DEVICE FOR EVENT NOTIFICATION, MOBILE TERMINAL, AND NON-TRANSITORY STORAGE MEDIUM

(71) Applicant: BEIJING XIAOMI MOBILE SOFTWARE CO., LTD., Beijing (CN)

(72) Inventor: Piguang Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/829,004

(22) Filed: Mar. 25, 2020

(65) Prior Publication Data

US 2021/0136684 A1 May 6, 2021

(30) Foreign Application Priority Data

Oct. 30, 2019 (CN) .......................... 201911043002.8

(51) Int. Cl.
*H04W 52/02* (2009.01)
*G06F 1/3293* (2019.01)

(52) U.S. Cl.
CPC ........ *H04W 52/028* (2013.01); *G06F 1/3293* (2013.01); *H04W 52/0229* (2013.01)

(58) Field of Classification Search
CPC ..................... H04W 52/028; H04W 52/0229
See application file for complete search history.

(56) References Cited

U.S. PATENT DOCUMENTS

| 6,943,667 | B1 * | 9/2005 | Kammer | G06F 1/3203 340/286.01 |
| 8,019,370 | B2 * | 9/2011 | Sengupta | G06F 1/3265 455/502 |
| 9,372,714 | B2 * | 6/2016 | Hara | G06F 9/452 |
| 9,807,689 | B2 * | 10/2017 | Oishi | H04W 52/0245 |
| 2009/0259865 | A1 | 10/2009 | Sheynblat | |
| 2011/0047015 | A1 * | 2/2011 | Twitchell, Jr. | H04W 52/0229 705/14.4 |
| 2014/0090047 | A1 | 3/2014 | Yuan et al. | |
| 2016/0054778 | A1 * | 2/2016 | Shin | G06F 1/3293 713/323 |
| 2016/0095030 | A1 * | 3/2016 | Lindoff | H04B 17/318 370/332 |

(Continued)

OTHER PUBLICATIONS

European Search Report in the European application No. 20169822.2, dated Oct. 9, 2020.

*Primary Examiner* — Dominic E Rego
(74) *Attorney, Agent, or Firm* — Syncoda LLC; Feng Ma

(57) ABSTRACT

A method for event notification can be implemented by a mobile terminal including a communication processing component and an application processing component. The method includes: a communication event is detected; a state of the application processing component is determined, the state of the application processing component including a sleep state and an awake state; when a communication event is detected, in response to determining that the application processing component is in the sleep state, notification information for notifying that the communication event is detected is stored into the communication processing component; and the stored notification information is sent to the application processing component when the application processing component is switched from the sleep state to the awake state.

18 Claims, 6 Drawing Sheets

(56) References Cited

U.S. PATENT DOCUMENTS

| | | | |
|---|---|---|---|
| 2017/0088072 A1* | 3/2017 | Curtis | G08B 31/00 |
| 2017/0317910 A1* | 11/2017 | Deng | H04L 43/10 |
| 2018/0314314 A1 | 11/2018 | Link, II | |
| 2019/0190622 A1* | 6/2019 | Lee | H04B 1/123 |
| 2020/0305229 A1* | 9/2020 | Jin | H04W 52/0222 |
| 2020/0356210 A1* | 11/2020 | Stone | G06F 3/0446 |

* cited by examiner

METHOD AND DEVICE FOR EVENT NOTIFICATION, MOBILE TERMINAL, AND NON-TRANSITORY STORAGE MEDIUM

CROSS-REFERENCE TO RELATED APPLICATION

This application claims priority to Chinese Patent Application No. 201911043002.8, filed on Oct. 30, 2019, the disclosure of which is hereby incorporated by reference in its entirety.

BACKGROUND

Generally, a mobile terminal adopts a dual-processor system consisting of an Application Processor (AP) and a Baseband Processor (BP). When the BP detects a communication event, the BP sends notification information for notifying that the communication event is detected to the AP.

SUMMARY

The disclosure relates to the technical field of wireless communications, and more particularly, to a method and device for event notification, a mobile terminal, and a non-transitory storage medium.

Embodiments of the disclosure provide a method and device for event notification, a mobile terminal, and a non-transitory storage medium.

According to a first aspect of the embodiments of the disclosure, a method for event notification is provided. The method can be implemented by a mobile terminal including a communication processing component and an application processing component. The method can include:

a communication event is detected;

a state of the application processing component is determined, where the state of the application processing component including a sleep state and an awake state;

when the communication event is detected, in response to determining that the application processing component is in the sleep state, notification information for notifying that the communication event is detected is stored into the communication processing component; and the stored notification information is sent to the application processing component when the application processing component is switched from the sleep state to the awake state.

According to a second aspect of the embodiments of the disclosure, a mobile terminal is provided. The mobile terminal including a communication processing component and an application processing component. The mobile terminal may include: a processor, a transceiver, and a memory arranged to store an executable program for the processor, where the processor can be arranged to:

detect a communication event;

determine a state of the application processing component, where the state of the application processing component including a sleep state and an awake state; and store, when the communication event is detected, in response to determining that the application processing component is in the sleep state, notification information for notifying that the communication event is detected into the communication processing component;

the transceiver is arranged to send the stored notification information to the application processing component when the application processing component is switched from the sleep state to the awake state.

According to a third aspect of the embodiments of the disclosure, a non-transitory storage medium having an executable program stored thereon is provided. When the executable program is executed by a processor, the method for event notification in the first aspect can be implemented.

It is to be understood that the above general descriptions and detailed descriptions below are only exemplary and explanatory and not intended to limit the embodiments of the disclosure.

BRIEF DESCRIPTION OF THE DRAWINGS

The accompanying drawings, which are incorporated in and constitute a part of this disclosure, illustrate embodiments consistent with the disclosure and, together with the description, serve to explain the principles of the embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments of the disclosure. Instead, they are merely examples of devices and methods consistent with aspects related to the embodiments of the disclosure as recited in the appended claims.

The terms used in the embodiments of the disclosure are for the purpose of describing particular embodiments only, and are not intended to limit the embodiments of the disclosure. "A/an," "the" and "this" in a singular form in the embodiments of the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

It is to be understood that although the terms first, second, third, etc. may be used in the embodiments of the disclosure to describe various information, such information should not be limited to these terms. These terms are only used to distinguish the same type of information from each other. For example, without departing from the scope of the embodiments of the disclosure, first information may also be called second information and, similarly, second information may also be called first information. For example, term "if" used here may be explained as "while" or "when" or "responsive to determining," which depends on the context.

Figure 1:
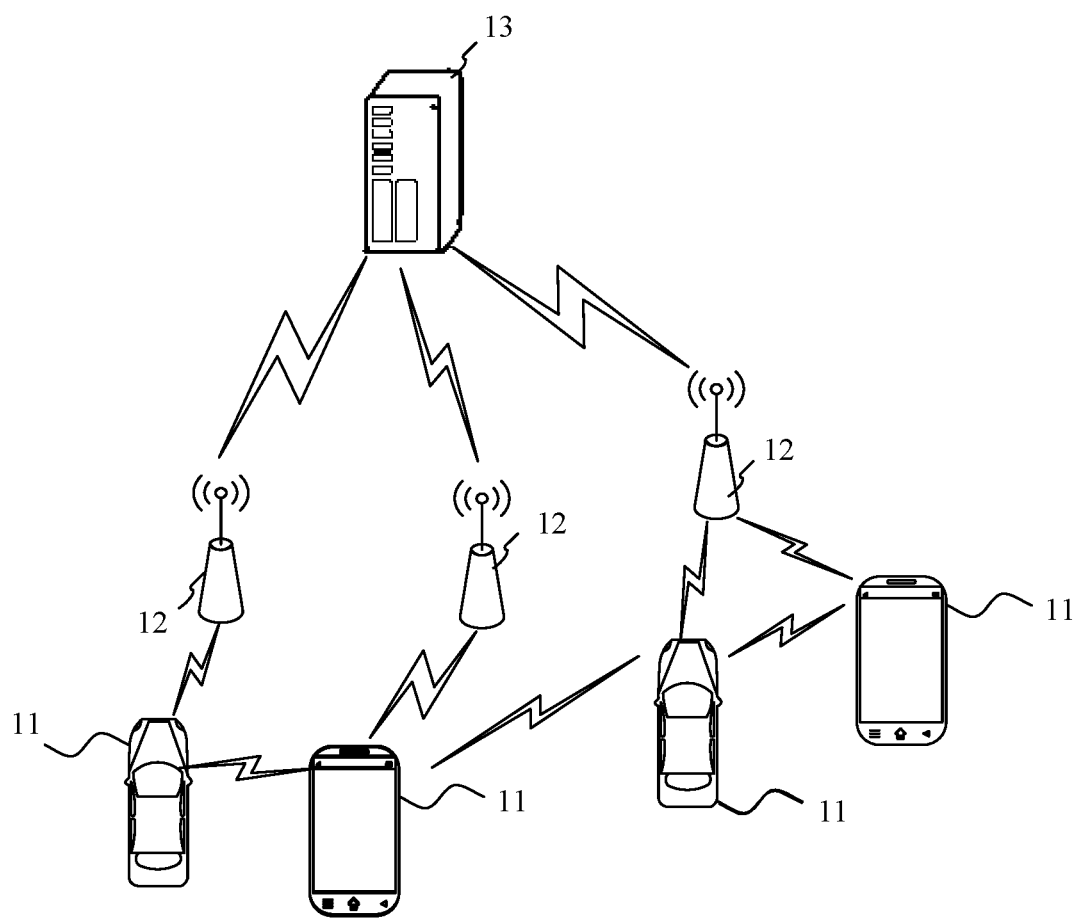
FIG. 1 is a schematic structural diagram of a wireless communication system according to some embodiments.

FIG. 1 illustrates a schematic structural diagram of a wireless communication system according to an embodiment of the disclosure. As illustrated in FIG. 1, the wireless communication system is a communication system based on a cellular mobile communication technology. The wireless communication system may include multiple terminals 11 and multiple base stations 12.

The terminal 11 may refer to a device that provides voice and/or data connectivity to a user. The terminal 11 may communicate with one or more core networks via a Radio Access Network (RAN). The terminal 11 can be an Internet of Things terminal, such as a sensor device, a mobile phone (or a "cellular" phone) and a computer with the Internet of Things terminal. The terminal may be, for example, a fixed, portable, pocket-sized, handheld, built-in computer or vehicle-mounted device, such as a Station (STA), a subscriber unit, a subscriber station, a mobile station, a mobile, a remote station, an access point, a remote terminal, an access terminal, a user terminal, a user agent, a user device, or a User Equipment (UE). Or, the terminal 11 can be a device of an unmanned aerial vehicle. Or, the terminal 11 may also be a vehicle-mounted device, such as a trip computer with a wireless communication function, or a wireless mobile terminal connected to an external trip computer. Or, the terminal 11 may also be a roadside device, such as a streetlight, a signal light or another roadside device with a wireless communication function.

The base station 12 can be a network-side device in a wireless communication system. The wireless communication system can be a $4^{th}$ generation mobile communication (4G) system, also known as a Long-Term Evolution (LTE) system. Or, the wireless communication system may also be a $5^{th}$ generation mobile communication (5G) system, also known as a New Radio (NR) system or a 5G NR system. Or, the wireless communication system may also be a next-generation system of a 5G system. The access network in the 5G system can be referred to as a New Generation-Radio Access Network (NG-RAN), or a Machine Type Communication (MTC) system.

The base station 12 can be an evolved NodeB (eNB) in a 4G system. Or, the base station 12 may also be a base station (gNB) with a central distributed architecture in a 5G system. When the base station 12 adopts a central distributed architecture, it usually includes a Central Unit (CU) and at least two Distributed Units (DUs). The CU is provided with a protocol stack of a Packet Data Convergence Protocol (PDCP) layer, a Radio Link Control (RLC) layer, and a Media Access Control (MAC) layer. The DU is provided with a protocol stack of a Physical (PHY) layer. The specific implementation manner of the base station 12 is not limited in the embodiments of the disclosure.

A wireless connection can be established between the base station 12 and the terminal 11 through a wireless air interface. In different implementation manners, the wireless air interface is a wireless air interface based on a 4G standard. Or, the wireless air interface is a wireless air interface based on a 5G standard, such as an NR. Or, the wireless air interface may also be a wireless air interface based on a 5G next-generation mobile communication standard.

In some embodiments, an End to End (E2E) connection may also be established between the terminals 11, such as a Vehicle to Vehicle (V2V) communication, a Vehicle to Infrastructure (V2I) communication and a Vehicle to Pedestrian (V2P) communication in a Vehicle to Everything (V2X) communication, and other scenarios.

In some embodiments, the above wireless communication system may further include a network management device 13.

The multiple base stations 12 are connected to the network management device 13. The network management device 13 can be a core network device in a wireless communication system. For example, the network management device 13 can be a Mobility Management Entity (MME) in an Evolved Packet Core (EPC) network. Or, the network management device may also be another core network device, such as a Serving GateWay (SGW), a Public Data Network GateWay (PGW), a Policy and Charging Rules Function (PCRF) entity or a Home Subscriber Server (HSS). The implementation form of the network management device 13 is not limited in the embodiments of the disclosure.

The execution subject involved in the embodiments of the disclosure includes, but is not limited to, a mobile terminal of a mobile communication network and the like.

The application scenario of the embodiments of the disclosure includes, but is not limited to, a 5G mobile communication system using a millimeter wave as a carrier. The coverage range of the base station is small due to a short wavelength. Therefore, during the use of a mobile terminal using a 5G mobile communication technology, cell reselection or cell handover will be more frequent. Generally, the mobile terminal adopts a dual-processor system consisting of an AP and a BP. When performing cell reselection and cell handover, the BP sends notification information for notifying the change of a cell to the AP. If the AP is in a low-power-consumption sleep state, the BP will wake up the AP from the low-power-consumption sleep state to a high-power-consumption awake state and then send the notification information to the AP. When cell reselection and cell handover occur frequently, the AP will be frequently woken up, thereby increasing the power consumption of the mobile terminal.

Figure 2:
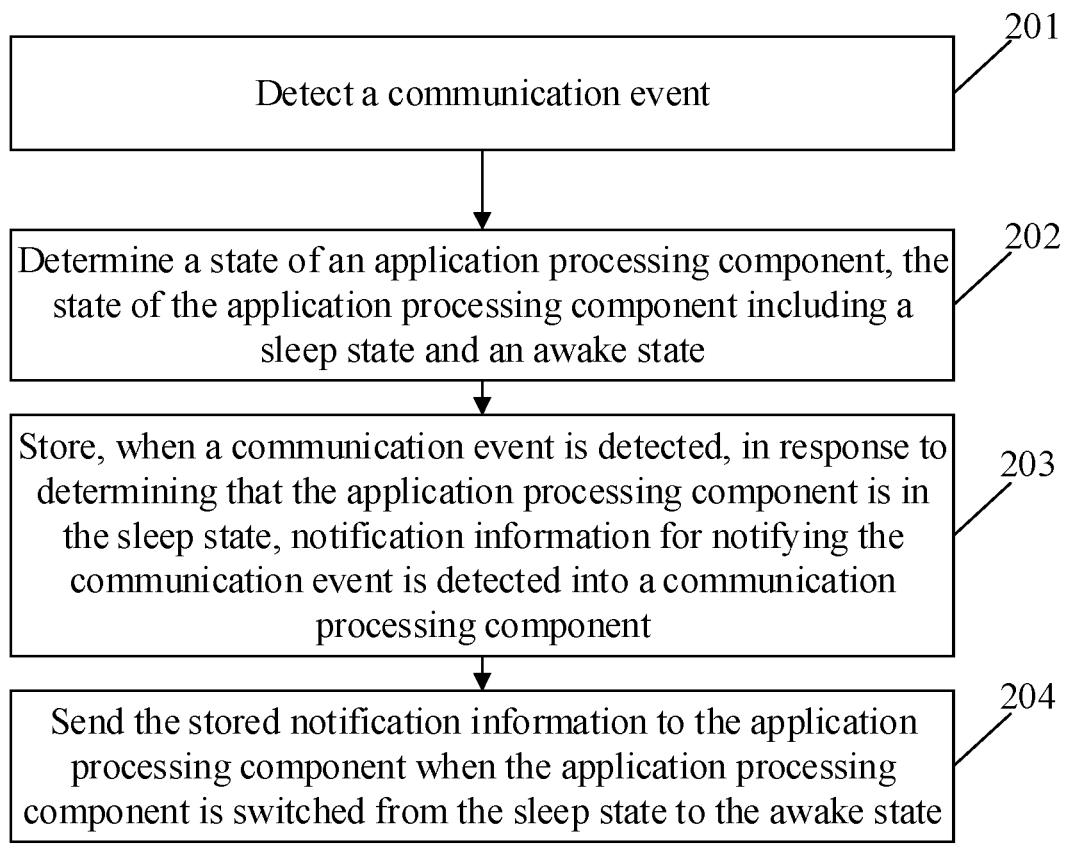
FIG. 2 is a flowchart of a method for event notification according to some embodiments.

As illustrated in FIG. 2, a method for event notification is provided according to some embodiments. The method is applied to a mobile terminal including a communication processing component and an application processing component. The method includes the following operations illustrated in blocks 201 to 204.

At block 201, a communication event is detected.

At block 202, a state of the application processing component is determined. The state of the application processing component includes a sleep state and an awake state.

At block 203, when the communication event is detected, in response to determining that the application processing component is in the sleep state, notification information for notifying that the communication event is detected is stored into the communication processing component.

At block 204, the stored notification information is sent to the application processing component when the application processing component is switched from the sleep state to the awake state.

Here, the mobile terminal can be a device such as a mobile phone. The mobile terminal can be a device that uses a 5G mobile communication technology for communication. A communication event can be a communication activity and change of the communication activity of a communication device such as a mobile terminal, or a communication activity and change of the communication activity between communication devices, such as an event related to change of a communication signal or change of a cell.

The communication processing component can be a component that implements a radio frequency communication processing function in the mobile terminal, and is arranged to perform communication event processing and the like.

The communication processing component may include a BP and the like.

The application processing component can be a component for executing an operating system, a user interface and an application in the mobile terminal. The application processing component may include an AP and the like.

At block 201, the communication processing component may detect a communication event such as a communication signal change-related event or a cell change-related event by monitoring communication signals around the mobile terminal, decoding a signal received by a radio frequency module, and processing a digital signal. In some embodiments, the communication processing component receives a signal from the radio frequency module, decodes and digitally processes the received signal, determines that the decoded signal meets the specifications of voice call, and determines that a voice call communication event is detected.

At block 202, when the application processing component is in the sleep state, the application processing component cannot receive the notification information. When the application processing component is in the awake state, the application processing component may receive the notification information. The power consumption when the application processing component is in the sleep state is lower than the power consumption when the application processing component is in the awake state. When the mobile terminal is in an off-screen state, the application processing component can be in the sleep state or the awake state. When the mobile terminal is in an on-screen state, the application processing component is in the awake state.

In the related art, if the application processing component is in a sleep mode, when the communication processing component detects a communication event, the application processing component is usually woken up from the sleep mode, and then notification information of the communication event is sent to the application processing component. In this way, when a communication event occurs frequently, the mobile terminal or the application processing component is frequently woken up, thereby increasing the power consumption of the mobile terminal.

At block 203, after the communication processing component detects a communication event, the communication processing component may first determine a state of the application processing component. The communication processing component may determine the state of the application processing component by reading a status register of the application processing component or detecting pins that reflect the state of the application processing component. Here, in a case that the communication processing component detects a communication event, when the application processing component is in the sleep state, the state of the mobile terminal is no longer switched, but the communication processing component stores notification information of the communication event. Here, the notification information of the communication event can be stored into an own cache of the communication processing component, or the notification information of the communication event can be stored into a predetermined position in a memory of the mobile terminal. In some embodiments, the communication processing component may store notification information of the communication event into the cache, and different pieces of notification information can be stored into the cache of the communication processing component in the form of a queue. After sending the notification information to the application processing component, the notification information that has been sent is identified as invalid in the cache. The notification information that is identified as invalid can be overwritten by newly received notification information. It is also possible to set fixed cache positions for different pieces of notification information, to overwrite old notification information with the latest received notification information, and to send the latest received notification in the cache to the application processing component. After the communication processing component stores the notification information, the stored notification information can be sent to the application processing component according to a preset sending condition. The preset sending condition can be that the application processing component is woken up.

At block 204, when the application processing component is switched from the sleep state to the awake state due to the trigger of other events and the like, the communication processing component sends the stored notification information to the application processing component. The other events can be user-triggered events and other events that must wake up the mobile terminal, such as voice calls. In some embodiments, when the mobile terminal is in an off-screen state, the application processing component is in the sleep state. When the communication processing component detects a cell reselection event in the off-screen state, the communication processing component stores notification information of the cell reselection event. When a user wakes up the mobile terminal to the on-screen state through a power key or the like, the application processing component is switched from the sleep state to the awake state. The communication processing component sends the stored notification information of the cell reselection event to the application processing component.

In this way, a situation where a mobile terminal is switched to a high-power-consumption state from a low-power-consumption state due to receiving of notification information of a communication event can be reduced, thereby reducing the power consumption of the mobile terminal, reducing the battery power consumption, prolonging the battery life, and improving the user experience.

In some embodiments, the operation illustrated in block 203 may include that: when the application processing component is in the sleep state, a type of the detected communication event is determined; and when the detected communication event is of a first type, notification information for notifying that the communication event is detected is stored into the communication processing component.

Here, communication events can be classified. For the processing of the first type of communication event, the processing of the first type of communication event by the mobile terminal can be taken as a default processing manner of the mobile terminal. The first type of communication event can be an event that does not require the application processing component to operate, or the first type of communication event may have a lower priority or a lower effectiveness than a second type of communication event, or the notification information of the first type of communication event can be processed in the background without affecting the real-time operation experience of users. Communication events can be classified according to the attributes of the communication events.

In a case that the communication processing component detects a communication event, when the application processing component is in the sleep state, the communication processing component may first determine a type of the communication event. If the communication event is of the first type, the communication event is processed in a default processing manner. The default processing manner can be that: the communication processing component stores notification information of the communication event, and when the application processing component is switched from the sleep state to the awake state due to a trigger of a event other than this communication event, the communication processing component sends the stored notification information to the application processing component.

In this way, the mobile terminal is no longer switched from the sleep state to the awake state due to the notification information for the first type of communication event, thereby reducing the power consumption of the mobile terminal.

In some embodiments, the method further includes that: when the detected communication event is of a second type, a switching instruction and the notification information of the detected communication event are sent to the application processing component, the second type being different from the first type. The notification information is received by the application processing component after the application processing component is switched to the awake state based on the switching instruction.

Here, the second type of communication event can be an event that has a high priority or has a real-time processing requirement and the like for the application processing component. If the communication processing component detects a communication event, when the application processing component is in the sleep state, the communication processing component may send a switching instruction to the application processing component. The switching instruction enables the application processing component to switch an own state from the sleep state to the awake state. The communication processing component sends notification information to the application processing component.

In some embodiments, when the communication processing component detects a cell handover event during the sleep state of the application processing component, the communication processing component first determines a type of the cell handover event. When the cell handover event is of a second type, the communication processing component sends a wakeup instruction to wake up the application processing component from the sleep state to the awake state, and sends notification information of the cell handover event to the application processing component in the awake state.

In this way, the mobile terminal adopts different notification manners for different types of communication events, which improves the flexibility of communication event notification.

In some embodiments, the method further includes that: a registration message sent by the application processing component is received; and classification information for distinguishing the first type from the second type is stored based on the registration message.

Here, the application processing component may send the classification information for distinguishing different communication events from each other to the communication processing component by sending a registration message.

The application processing component may send registration information of first type of communication event and registration information of the second type of communication event respectively. The communication processing component may determine that the communication event is of a first type or a second type according to the registration information.

The application processing component may also send only the registration message of the second type of communication event. The communication processing component may determine a communication event with a registration message as the second type of communication event, and a communication event without a registration message as the first type of communication event by default.

In some embodiments, the method further includes that: a registration message sent by the application processing component is received; and classification information for distinguishing the first type from the second type is stored based on the registration message.

The application processing component may use an un-registration mode to change the registration message of the communication event, and then change the type of the communication event.

In some embodiments, the application processing component may also send only the registration message of the second type of communication event. The communication processing component determines a communication event with a registration message as the second type of communication event, and a communication event without a registration message as the first type of communication event by default. The application processing component may un-register a registered communication event, and remove a registration message of a communication event from the communication processing component. In this way, when the communication processing component detects the communication event, it is determined that the communication event is of the first type since the communication event has no registration message. For example, the cell handover event can be un-registered from the second type of communication event. In this way, when the application processing module is in the sleep state and the communication processing component detects a cell handover event, the communication processing component stores notification information of the cell handover event. When the mobile terminal switches the application processing component to the awake state due to manual trigger, the communication processing component sends the notification information of the cell handover event to the application processing component.

In some embodiments, the first type of communication event includes: a cell change-related event of the mobile terminal.

The cell change-related event of the mobile terminal may include events such as cell reselection, cell handover and change in a signal of a cell of the mobile terminal. In the process of using a 5G mobile communication technology, the coverage range of a base station is small due to a short wavelength. The cell change-related events may occur more frequently. For the situation that the application processing component is in the sleep state, when the communication processing component detects a cell handover event, the communication processing component stores notification information of the cell handover event. When the mobile terminal switches the application processing component to the awake state due to manual trigger, the communication processing component sends the notification information of the cell handover event to the application processing component. In this way, the frequency of switching the application processing component from the sleep state to the awake state can be reduced, thereby reducing power consumption and prolonging the battery standby time of the mobile terminal.

In some embodiments, the method further includes that: when the application processing component is in the awake state, the notification information is sent to the application processing component.

Here, when the application processing component is switched to the awake state, the application processing component can be in a state capable of receiving notification information of a communication event. Therefore, when the communication processing component sends the notification information of the communication event to the application processing component, it is not necessary to switch the state of the application processing component, and no additional power consumption is caused due to the application processing component switching from a low-power-consumption state to a high-power-consumption state. If the communication processing component detects a communication event, when the application processing component is switched to the awake state, notification information can be directly sent to the application processing component.

Here, when the mobile terminal is in the sleep state, the application processing component is usually also in the sleep state and cannot receive notification information of the communication event. When the mobile terminal is in the awake state, the application processing component is usually also in the awake state and may receive notification information of the communication event. Therefore, when the mobile terminal is in the sleep state and the communication processing component detects a first type of communication event, notification information of the communication event is stored. After the mobile terminal is switched to the awake state, the notification information of the communication event is sent to the application processing component. When the mobile terminal is in the sleep state and the communication processing component detects a second type of communication event, the communication processing component may wake up the application processing component, so that after the mobile terminal is switched to the awake state, notification information of the communication event is sent to the application processing component.

When the mobile terminal is in an off-screen state, the application processing component is in the sleep state and cannot receive notification information of the communication event. When the mobile terminal is in an on-screen state, the application processing component is in the awake state and may receive notification information of the communication event. Therefore, when the mobile terminal is in the off-screen state and the communication processing component detects a first type of communication event, notification information of the communication event can be stored. After the mobile terminal is switched to the on-screen state, the notification information of the communication event is sent to the application processing component. When the mobile terminal is in the off-screen state and the communication processing component detects a second type of communication event, the communication processing component may wake up the application processing component, so that after the mobile terminal is switched to the on-screen state, notification information of the communication event is sent to the application processing component.

In some embodiments, the communication processing component at least includes a BP.

The application processing component at least includes an AP.

Generally, the mobile terminal adopts a dual-processor architecture consisting of an AP and a BP. The BP processes communication events. The AP is arranged to execute an operating system, a user interface, and the like. Here, the BP may detect a communication event, send notification information of the communication event, and send switching information to switch the state of the mobile terminal, and the like. The AP receives the notification information of the communication event, and makes corresponding settings for the notification information in the operating system and the user interface. For example, when receiving notification information of a cell handover event, the AP may display the signal strength of a handover cell in the user interface, and the like.

In some embodiments, the application processing component belongs to an application system of the mobile terminal. The communication processing component belongs to a baseband system of the mobile terminal. The mobile terminal usually takes the form of a dual-processor system consisting of an AP and a BP. Here, the application processing component can belong to an application system of the mobile terminal, and the communication processing component can belong to a baseband system of the mobile terminal. The application system may usually be composed of software and hardware, including application processing assemblies. The baseband system may usually be composed of software and hardware, including baseband processing assemblies.

A specific example is provided below in combination with any of the above embodiments.

The mobile terminal includes an Application Processor (AP) and a Baseband Processor (BP). For a communication event detected by the BP, the AP can be notified in the following manners.

Figure 3:
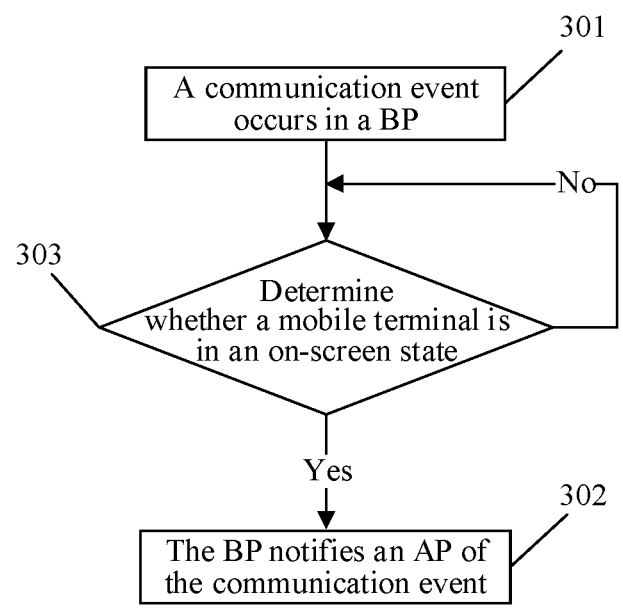
FIG. 3 is a flowchart of a method for event notification according to some embodiments.

Manner 1, as illustrated in FIG. 3, by default, the communication event notification operation includes the following actions.

At block 301, a communication event occurs in the BP.

At block 302, when the mobile terminal is in an on-screen state, the BP notifies the AP of the communication event.

At block 303, when the mobile terminal is in an off-screen state, the BP does not notify the AP of the communication event. When the AP is in an on-screen state, the BP immediately notifies the AP of a communication event that has occurred.

Figure 4:
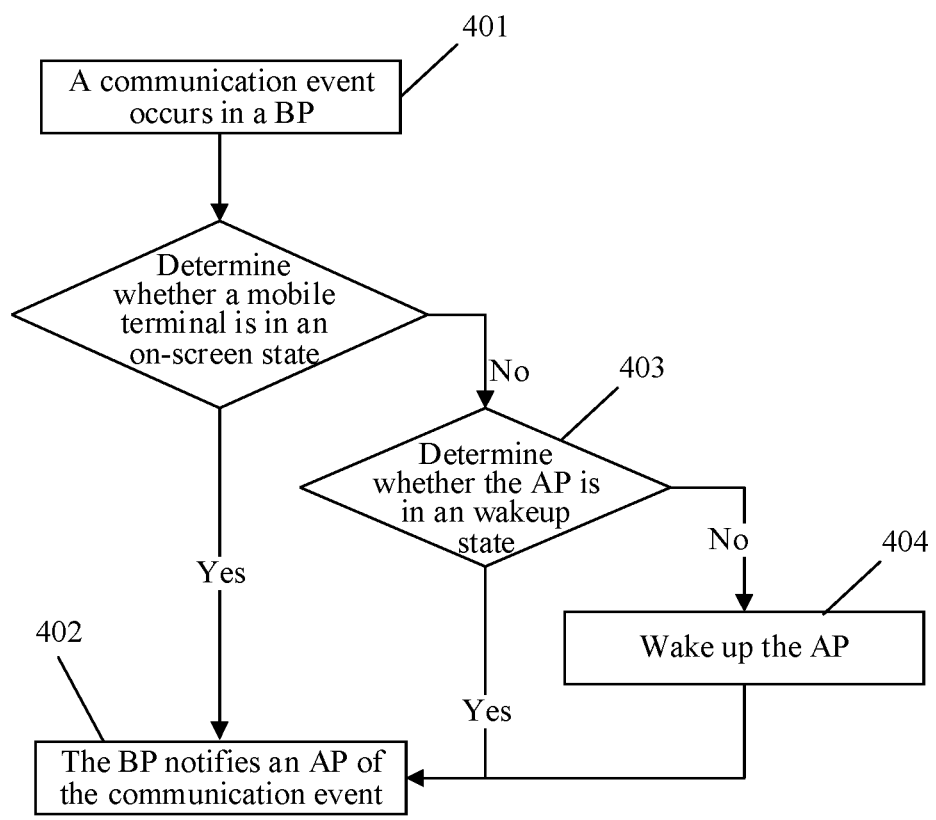
FIG. 4 is a flowchart of another method for event notification according to some embodiments.

Manner 2, as illustrated in FIG. 4, when the AP has a special requirement for a communication event of the BP, the AP registers the communication event with the BP. The communication event notification operation includes the following actions.

At block 401, a communication event occurs in the BP.

At block 402, the mobile terminal is in an on-screen state. When the BP detects that the communication event occurs, the BP immediately notifies the AP.

At block 403, the mobile terminal is in an off-screen state. When the BP detects that the communication event occurs, if the AP is in a awake state, the BP notifies the AP.

At block 404, if the AP is sleeping, the BP immediately wakes up the AP and notifies the AP of the communication event.

Manner 3, when the AP does not have special requirements for a communication event of the BP, the AP un-registers the communication event with the BP. At this time, the communication event can be notified in manner 1.

Manner 4, in order to reduce the standby power consumption, the AP may un-register a communication event related to a cell change with the BP.

Figure 5:
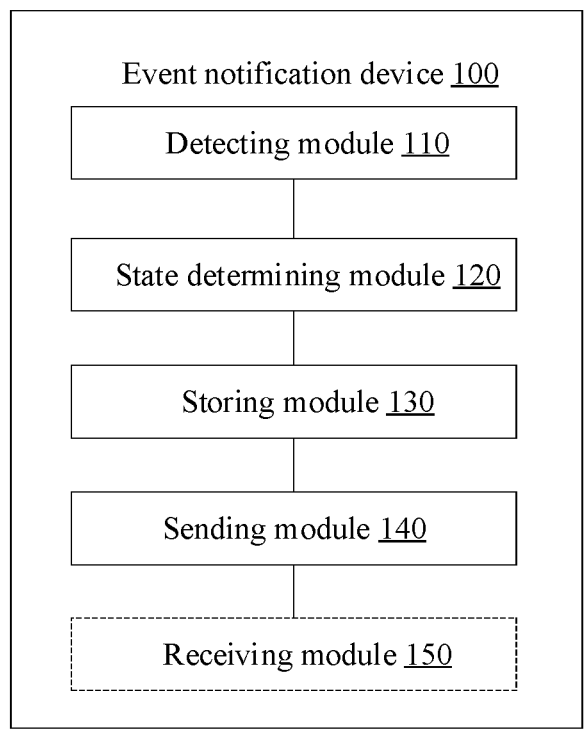
FIG. 5 is a block diagram of a device for event notification according to some embodiments.

An embodiment of the disclosure also provides a device for event notification. The device is applied to a mobile terminal. FIG. 5 is a schematic structure diagram of a device for event notification 100 according to an embodiment of the disclosure. The device 100 includes a detecting module 110, a state determining module 120, a storing module 130, and a sending module 140.

The detecting module 110 is arranged to detect a communication event.

The state determining module 120 is arranged to determine a state of the application processing component. The state of the application processing component includes a sleep state and an awake state.

The storing module 130 is arranged to store, when a communication event is detected, in response to determining that the application processing component is in the sleep state, notification information for notifying that the communication event is detected into the communication processing component.

The sending module 140 is arranged to send the stored notification information to the application processing component when the application processing component is switched from the sleep state to the awake state.

In some embodiments, the storing module 130 is specifically arranged to:

determine, in response to determining that the application processing component is in the sleep state, a type of the detected communication event; and store, in response to determining that the detected communication event is of a first type, the notification information for notifying that the communication event is detected into the communication processing component.

In some embodiments, the sending module 140 is further arranged to send, in response to determining that the detected communication event is of a second type, a switching instruction and the notification information to the application processing component, the second type being different from the first type.

The notification information is received by the application processing component after switching to the awake state based on the switching instruction.

In some embodiments, the device 100 further includes:

a receiving module 150, arranged to receive a registration message sent by the application processing component.

The storing module 130 is further arranged to store information of the type of the communication event based on the registration message.

In some embodiments, the receiving module 150 is further arranged to receive an un-registration message sent by the application processing component.

The storing module 130 is further arranged to update the stored information of the type of the communication event based on the un-registration message.

In some embodiments, the first type of communication event includes: a cell change-related event of the mobile terminal.

In some embodiments, the sending module 140 is further arranged to send, in response to determining that the application processing component is in the awake state, the notification information to the application processing component.

In some embodiments, the communication processing component includes at least: a BP.

The application processing component includes at least: an AP.

In some embodiments, the application processing component can be part of an application system of the mobile terminal.

The communication processing module can be part of a baseband system of the mobile terminal.

In some embodiments, the detecting module 110, the state determining module 120, the storing module 130, the sending module 140, the receiving module 150, and the like can be implemented by one or more Central Processing Units (CPUs), Graphics Processing Units (GPUs), BPs, Application Specific Integrated Circuits (ASICs), Digital Signal Processors (DSPs), Programmable Logic Devices (PLDs), Complex Programmable Logic Devices (CPLDs), Field-Programmable Gate Arrays (FPGAs), general-purpose processors, controllers, Micro Controller Units (MCUs), microprocessors, or other electronic components, or may also be implemented in combination with one or more Radio Frequency (RF) antennas, for performing the foregoing method.

The methods described above according to some embodiments of the disclosure can be applied to a mobile terminal including a communication processing component and an application processing component. A communication event is detected. A state of the application processing component is determined, the state of the application processing component including a sleep state and an awake state. When a communication event is detected, in response to determining that the application processing component is in the sleep state, notification information for notifying that the communication event is detected is stored into the communication processing component. When the application processing component is switched from the sleep state to the awake state, the stored notification information is sent to the application processing component. Because the application processing component has higher power consumption in the awake state than the sleep state, when the application processing component is in the sleep state, the communication processing component stores notification information for notifying that the communication event is detected, so that a situation of switching a mobile terminal to a high-power-consumption state from a low-power-consumption state due to receiving of notification information of a communication event can be reduced, thereby reducing the power consumption of the mobile terminal, reducing the battery power consumption, prolonging the battery life, and improving the user experience.

Figure 6:
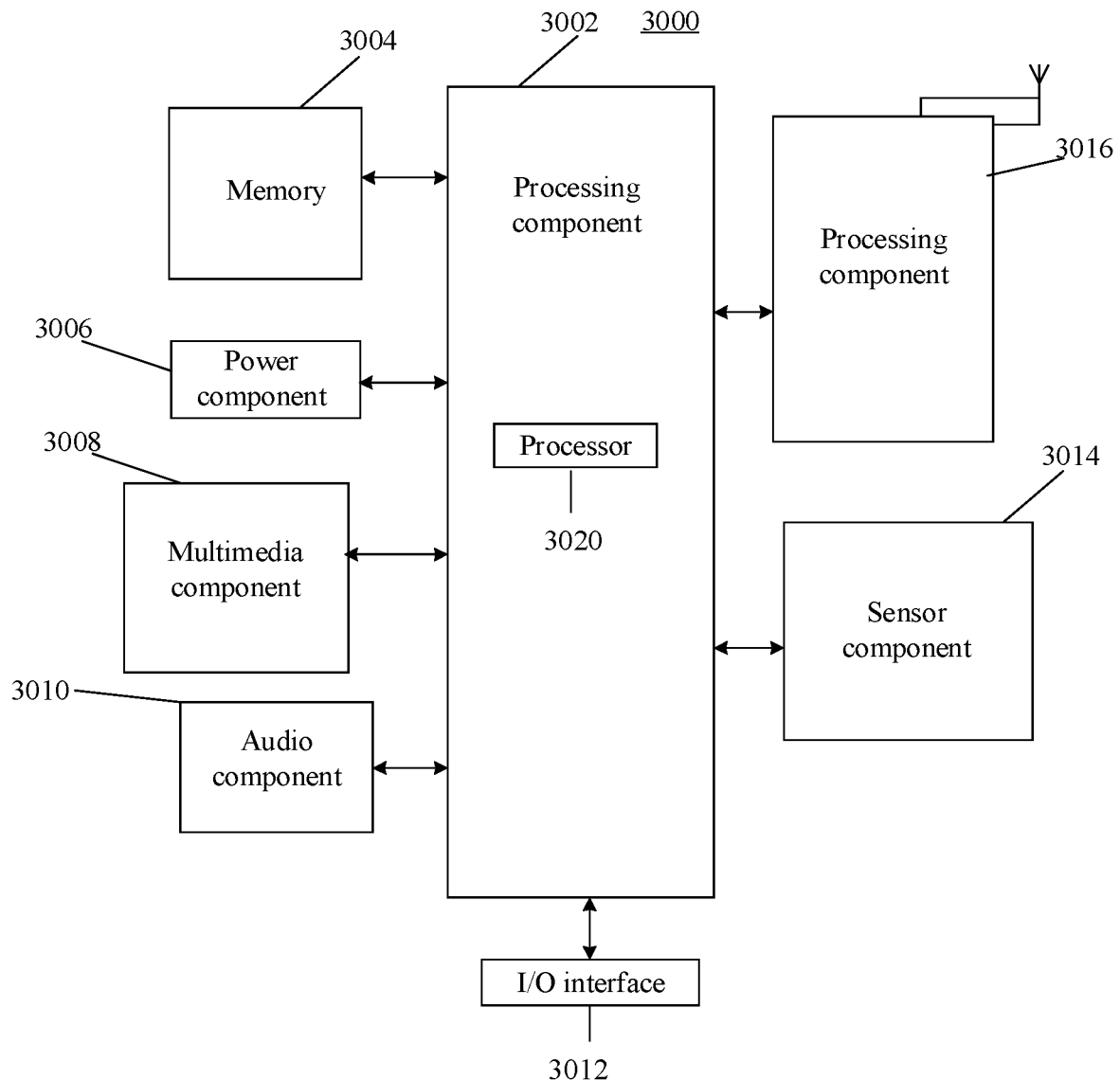
FIG. 6 is a block diagram of a device for event notification according to some embodiments.

FIG. 6 is a block diagram illustrating a device 3000 for event notification according to some embodiments. For example, the device 3000 can be a mobile phone, a computer, a digital broadcast terminal, a messaging device, a gaming console, a tablet, a medical device, exercise equipment, a personal digital assistant, and the like.

Referring to FIG. 6, the device 3000 may include one or more of the following components: a processing component 3002, a memory 3004, a power component 3006, a multimedia component 3008, an audio component 3010, an Input/Output (I/O) interface 3012, a sensor component 3014, and a communication component 3016.

The processing component 3002 typically controls overall operations of the device 3000, such as operations associated with display, telephone calls, data communications, camera operations, and recording operations. The processing component 3002 may include one or more processors 3020 to execute instructions to perform all or part of the operations in the above described methods. Moreover, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is arranged to store various types of data to support the operation of the device 3000. Examples of such data include instructions for any applications or methods operated on the device 3000, contact data, phonebook data, messages, pictures, video, etc. The memory 3004 can be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 3006 provides power to various components of the device 3000. The power component 3006 may include: a power management system, one or more power supplies, and any other components associated with the generation, management and distribution of power in the device 3000.

The multimedia component 3008 includes a screen providing an output interface between the device 3000 and the user. In some embodiments, the screen may include a Liquid Crystal Display (LCD) and a Touch Panel (TP). In some embodiments, the screen may include an organic light-emitting diode (OLED) display or other types of displays. If the screen includes the TP, the screen can be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 3008 includes a front camera and/or a rear camera. The front camera and/or the rear camera may receive an external multimedia data while the device 3000 is in an operation mode, such as a photographing mode or a video mode. Each of the front camera and the rear camera can be a fixed optical lens system or has focus and optical zoom capability.

The audio component 3010 is arranged to output and/or input audio signals. For example, the audio component 3010 includes a Microphone (MIC) arranged to receive an external audio signal when the device 3000 is in an operation mode, such as a call mode, a recording mode, and a voice recognition mode. The received audio signal can be further stored into the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, or buttons. The buttons may include, but are not limited to, a home button, a volume button, a starting button, and a locking button.

The sensor component 3014 includes one or more sensors to provide state assessments of various aspects of the device 3000. For example, the sensor component 3014 may detect an open/closed state of the device 3000, and relative positioning of components. For example, the component is the display and the keypad of the device 3000. The sensor component 3014 may also detect a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor arranged to detect the presence of nearby objects without any physical contact. The sensor component 3014 may also include a light sensor, such as a Complementary Metal Oxide Semiconductor (CMOS) or Charge Coupled Device (CCD) image sensor, for use in imaging applications. In some embodiments, the sensor component 3014 may also include an acceleration sensor, a gyroscope sensor, a magnetic sensor, a pressure sensor, or a temperature sensor.

The communication component 3016 is arranged to facilitate communication, wired or wirelessly, between the device 3000 and other devices. The device 3000 may access a wireless network based on a communication standard, such as Wireless Fidelity (Wi-Fi), second generation wireless telephone technology (2G) or 3rd-generation wireless telephone technology (3G), or a combination thereof. In some embodiments, the communication component 3016 receives a broadcast signal or broadcast associated information from an external broadcast management system via a broadcast channel. In some embodiments, the communication component 3016 further includes a Near Field Communication (NFC) module to facilitate short-range communications. For example, the NFC module can be implemented based on a Radio Frequency Identification (RFID) technology, an Infrared Data Association (IrDA) technology, an Ultra-Wideband (UWB) technology, a Bluetooth (BT) technology, and other technologies.

In some embodiments, the device 3000 can be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In some embodiments, there is also provided a non-transitory computer-readable storage medium including instructions, such as included in the memory 3004, executable by the processor 3020 of the device 3000 to complete the above described methods. For example, the non-transitory computer-readable storage medium can be a ROM, a Random-Access Memory (RAM), a Compact Disc Read-Only Memory (CD-ROM), a magnetic tape, a floppy disc, an optical data storage device and the like.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A method for event notification, implemented by a mobile terminal comprising a communication processing component and an application processing component, the method comprising:
   detecting a communication event;
   determining a state of the application processing component, wherein the state of the application processing component comprises a sleep state and an awake state;
   when the communication event is detected, storing, in response to determining that the application processing component is in the sleep state, notification information for notifying that the communication event is detected into the communication processing component; and
   sending the stored notification information to the application processing component when the application processing component is switched from the sleep state to the awake state;
   wherein said when the communication event is detected, storing, in response to determining that the application processing component is in the sleep state, the notification information for notifying that the communication event is detected into the communication processing component comprises:
   determining, in response to determining that the application processing component is in the sleep state, a type of the detected communication event; and
   storing, in response to determining that the detected communication event is of a first type, the notification information for notifying that the communication event is detected into the communication processing component.

2. The method of claim 1, further comprising:
   sending, in response to determining that the detected communication event is of a second type, a switching instruction and the notification information to the application processing component,
   wherein the second type is different from the first type, and the notification information is received by the application processing component after switching to the awake state based on the switching instruction.

3. The method of claim 2, further comprising:
   receiving a registration message from the application processing component; and
   storing information of the type of the communication event based on the registration message.

4. The method of claim 3, further comprising:
   receiving an un-registration message from the application processing component; and
   updating the stored information of the type of the communication event based on the un-registration message.

5. The method of claim 1, wherein the first type of communication event comprises a cell change-related event of the mobile terminal.

6. The method of claim 1, further comprising:
   sending, in response to determining that the application processing component is in the awake state, the notification information to the application processing component.

7. The method of claim 1, wherein the communication processing component comprises a Baseband Processor (BP); and
   the application processing component comprises an Application Processor (AP).

8. The method of claim 1, wherein the application processing component is part of an application system of the mobile terminal; and
   the communication processing component is part of a baseband system of the mobile terminal.

9. A mobile terminal implementing the method of claim 1, comprising the communication processing component and the application processing component, wherein
   the application processing component has higher power consumption in the awake state than the sleep state;
   the mobile terminal is configured to, when the application processing component is in the sleep state, control the communication processing component to store the notification information, to thereby reduce situations of switching the mobile terminal to a high-power-consumption state from a low-power-consumption state due to receiving the notification information of the communication event, and reduce power consumption of the mobile terminal.

10. A mobile terminal, comprising:
    a processor;
    a transceiver; and
    memory storing a program for execution by the processor to:
    detect a communication event;
    determine a state of an application processing component in the mobile terminal, wherein the state of the application processing component comprises a sleep state and an awake state; and
    store, when the communication event is detected, in response to determining that the application processing component is in the sleep state, notification information for notifying that the communication event is detected into a communication processing component in the mobile terminal;
    wherein the transceiver is arranged to send the stored notification information to the application processing component when the application processing component is switched from the sleep state to the awake state;
    wherein the processor is further configured to:
    determine, in response to determining that the application processing component is in the sleep state, a type of the detected communication event; and
    store, in response to determining that the detected communication event is of a first type, the notification information for notifying that the communication event is detected into the communication processing component.

11. The mobile terminal of claim 10, wherein the transceiver is further arranged to send, in response to determining that the communication event is of a second type, a switching instruction and the notification information to the application processing component,
    wherein the second type is different from the first type, and the notification information is received by the application processing component after switching to the awake state based on the switching instruction.

12. The mobile terminal of claim 11, wherein the transceiver is arranged to receive a registration message from the application processing component; and wherein the processor is further arranged to store information of the type of the communication event based on the registration message.

13. The mobile terminal of claim 12, wherein
the transceiver is further arranged to receive an un-registration message from the application processing component; and
the processor is further arranged to update the stored information of the type of the communication event based on the un-registration message.

14. The mobile terminal of claim 10, wherein the first type of communication event comprises a cell change-related event of the mobile terminal.

15. The mobile terminal of claim 10, wherein the transceiver is further arranged to send, in response to determining that the application processing component is in the awake state, the notification information to the application processing component.

16. The mobile terminal of claim 10, wherein the communication processing component comprises a Baseband Processor (BP); and
the application processing component comprises an Application Processor (AP).

17. The mobile terminal of claim 10, wherein the application processing component is part of an application system of the mobile terminal; and
the communication processing component is part of a baseband system of the mobile terminal.

18. A non-transitory storage medium having stored therein an executable program that, when executed by a processor, causes the processor to perform a method for event notification, the method comprising:

detecting a communication event;
determining a state of an application processing component in a mobile terminal, wherein the state of the application processing component comprises a sleep state and an awake state;
when the communication event is detected, storing, in response to determining that the application processing component is in the sleep state, notification information for notifying that the communication event is detected into a communication processing component in the mobile terminal; and
sending the stored notification information to the application processing component when the application processing component is switched from the sleep state to the awake state;
wherein said when the communication event is detected, storing, in response to determining that the application processing component is in the sleep state, the notification information for notifying that the communication event is detected into the communication processing component comprises:
determining, in response to determining that the application processing component is in the sleep state, a type of the detected communication event; and
storing, in response to determining that the detected communication event is of a first type, the notification information for notifying that the communication event is detected into the communication processing component.

* * * * *